United States Patent [19]

Kitabayashi et al.

[11] Patent Number: 4,743,117
[45] Date of Patent: May 10, 1988

[54] DEVICE FOR OPTICALLY MEASURING ASPHERIC SURFACE

[75] Inventors: Junichi Kitabayashi, Machida; Toshio Kanoh, Tokyo, both of Japan

[73] Assignee: Ricoh Company, Ltd., Tokyo, Japan

[21] Appl. No.: 4,490

[22] Filed: Jan. 20, 1987

[30] Foreign Application Priority Data

Jan. 20, 1986 [JP] Japan ............................ 61-009380

[51] Int. Cl.⁴ .............................................. G01B 9/02
[52] U.S. Cl. .................................... 356/353; 356/360
[58] Field of Search ...................... 356/353, 359, 360

[56] References Cited

PUBLICATIONS

Kharitonov et al., "On Some Methods of Testing Aspherical Wavefronts by Means of a Shearing Interferometer", Sov. J. Opt. Tech., vol. 43, No. 7, pp. 439–441, 7/76.

Emmel et al., "A New Instrument for Routine Optical Testing of General Aspherics", Proc. SPIE, vol. 171, pp. 93–99, 1979.

Primary Examiner—Davis L. Willis
Assistant Examiner—Matthew W. Koren
Attorney, Agent, or Firm—Oblon, Fisher, Spivak, McClelland & Maier

[57] ABSTRACT

A device for optically measuring an aspheric surface includes a fringe-scanning shearing interferometer for applying a wavefront of illuminating light to the aspheric surface and optically measuring the aspheric surface based on light reflected by the aspheric surface along a measurement optical path. A plurality of ring filters having respective different light-transmitting areas are successively positionable, one at a time, in the illuminating light and outside of the measurement optical path for applying divided portions of the wavefront of illuminating light successively to the aspheric surface. The radius of curvature of the wavefront of illuminating light applied to the aspheric surface is measured.

3 Claims, 1 Drawing Sheet

U.S. Patent   May 10, 1988   4,743,117
FIG. 3(III)
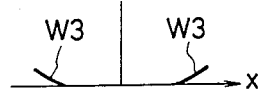

DEVICE FOR OPTICALLY MEASURING ASPHERIC SURFACE

BACKGROUND OF THE INVENTION

1. Field of the Invention:

The present invention relates to a device for optically measuring the shape of an aspheric surface.

2. DESCRIPTION OF THE PRIOR ART

It has been general practice to optically measure the aspheric shape of an object surface by applying a spherical wave of light to the object surface to be measured, measuring the shape of a wavefront of light reflected from the object surface, and correcting the measured wavefront shape with the shape of the incident spherical wave.

Where only one spherical wave is available for application to an aspheric surface to be measured, the aspheric surface must be of a shape analogous to that of the applied spherical wave. If the shape of the aspheric surface to be measured deviated largely from the shape of the applied spherical wave, then the shape of the aspheric surface could not be measured. Therefore, in case only one spherical wave is employed for measurement, the measurement range for aspheric surfaces is relatively small.

One proposed way of widening the measurement range for aspheric surfaces is to use a plurality of spherical waves having different radii of curvature in measuring one aspheric surface (see "Method of measuring an aspheric surface shape using a plurality of interferograms" in Optics, Vol. 12, No. 4, Aug. 1983). This method is based on the Twyman-Green interferometer. However, the proposed process is disadvantageous in that extraneous light tends to enter a region being measured, causing a measurement error, and the measurement accuracy cannot be increased since the resolution for reading interference fringes is low.

SUMMARY OF THE INVENTION

In view of the aforesaid problems of the conventional processes of measuring aspheric surfaces, it is an object of the present invention to provide a device for optically measuring an aspheric surface with high accuracy while removing extraneous light which would result in a meaurement error.

According to the present invention, a device for optically measuring an aspheric surface includes a fringe-scanning shearing interferometer for measuring the aspheric surface based on light reflected thereby, a plurality of successively selectable ring filters, and means for measuring the radius of curvature of a wavefront of illuminating light applied to the aspheric surface.

The fringe-scanning shearing interferometer applies the wavefront of illuminating light to the aspheric surface and divides the light reflected by the aspheric surface into two equivalent light beams which are relatively sheared or shifted slightly in a direction normal to the direction of travel of the light beams. The relatively shifted light beams produce interference fringes on an area sensor. By changing the length of the path of one of the light beams at small successive steps or intervals, the interference fringes are changed, and the pattern of varying interference fringes is read by the area sensor. The shape of the wavefront of illuminating light is determined by analyzing the interference fringe pattern, and the shape of the measured aspheric surface can be known from the determined wavefront shape.

When determining the shape of the measured aspheric surface based on the wavefront shape, it is necessary to obtain information regarding the wavefront applied to the measured surface.

The ring filters are successively positioned in the path of illuminating light and outside of a measurement optical path for successively applying divided portions of the wavefront of illuminating light to the aspheric surface.

The above and other objects, features and advantages of the present invention will become more apparent from the following description when taken in conjunction with the accompanying drawings in which a preferred embodiment of the present invention is shown by way of illustrative example.

DETAILED DESCRIPTION

Figure 1:
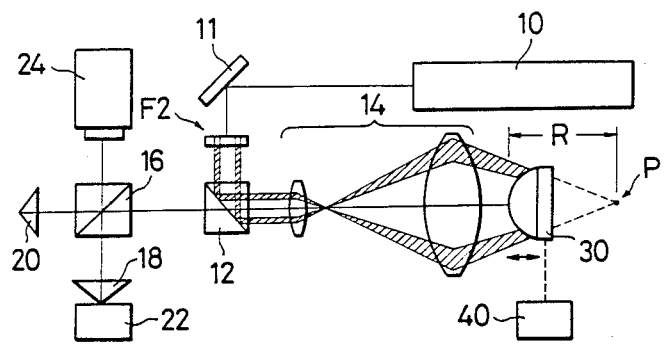
FIG. 1 is a schematic view of a device for optically measuring an aspheric surface according to the present invention.

As shown in FIG. 1, a device for optically measuring an aspheric surface according to the present invention includes a laser beam source 10, a plane mirror 11, a beam splitter 12, a converter lens system 14, a beam splitter 16, corner-cube prisms 18, 20, a piezoelectric device 22, and an area sensor 24. These components jointly constitute a fringe-scanning shearing interferometer. The device also includes a ring filter, here F2, which is selected from a plurality of available ring filters.

An object 30 with its aspheric surface to be measured is positioned adjacent to the converter lens system 14 and is movable by a suitable moving means (not shown) along the optical axis of the converter lens system 14.

The converter lens system 14, the beam splitters 12, 16, and the corner-cube prisms 18, 20 jointly constitute a measurement optical path of the fringe-scanning shearing interferometer.

A laser beam emitted by the laser beam source 10 is passed through a beam expander (not shown) and caused thereby to be a parallel-ray beam of a certain beam diameter, which is then reflected by the plane mirror 11 to travel through the ring filter F2. The portion of the beam which has passed through the ring filter F2 is reflected by the beam splitter 12 to go through the converter lens system 14, by which the aspheric surface of the object 30 is illuminated.

Therefore, the plane mirror 11, the beam splitter 12, and the converter lens system 14 jointly constitute an illumination optical path of the of the fringe-scanning shearing interferometer. The ring filter is positioned in the illuminating beam (parallel-ray beam) in the illumination optical path, but outside of the measuring optical path of the fringe-scanning shearing interferometer.

The converter lens system 14 serves to convert the illuminating beam into a spherical wave of light and applies the same to the aspheric surface of the object 30. In the embodiment of FIG. 1, the converter lens system 14 is fixed in position, and the focused point P of the spherical wave applied to the aspheric surface of the object 30 is fixed in the device.

A measuring means 40, which includes the moving means, as described above, for moving the object 30 along the optical axis of the converter lens system 14, can determine the radius of curvature R of the spherical wave applied to the aspheric surface of the object 30 based on the relative positional relationship between the focused point P and the object 30.

A variety of ring filters are avaiable for selective use in the device shown in FIG. 1. The number and type of ring filters to be employed are determined according to the aspheric degree of the aspheric surface to be measured. Two or more ring filters are selectively used in the illumination optical path. The ring filters to be used may be manually selected, or may be arranged on a turret for automatic selection. In the embodiment of FIG. 1, the number and type of ring filters to be used are determined by previously putting in an optical system simulation program data about the aspheric degree of the object and the position of the object at the time of measurement.

Figure 2:
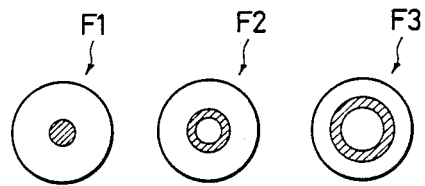
FIG. 2 is a front elevational view of ring filters used.

It is assumed here that three ring filters F1, F2, F3 shown in FIG. 2 are available for selective use in the device of FIG. 1. These filters have areas, shown as shaded, through which light can be transmitted. The term "ring filter" is derived from the ring-shaped light-transmitting areas of the filters F2, F3. The filter F1 with the circular or substantially ring-shaped light-transmitting area is also referred to as a ring filter.

A process of measuring an aspheric surface will be described below. The ring filter F1 is positioned in place of the ring filter F2 in FIG. 1, and then the laser beam source 10 is energized to emit a laser beam. The spherical wave from the converter lens system 14 is applied to the aspheric surface of the object 30 in the vicinity of the optical axis of the converter lens system 14. The object 30 is then moved along the optical axis into a position in which the wavefront of the spherical wave from the converter lens system 14 most fits the aspheric surface of the object 30, whereupon the object 30 is stopped in that position.

Light reflected from the aspheric surface of the object 30 passes through the converter lens system 14 and then the beam splitter 12, and is divided by the beam splitter 16 into two equivalent beams, which are directed to the corner-cube prisms 18, 20, respectively. The light beams reflected by the corner-cube prisms 18, 20 are directed to the beam splitter 16 again and are caused thereby to fall together on the light-detecting surface of the area sensor 24.

The light beam reflected by the prism 20 is sheared or shifted with respect to the other light beam by slight displacement of the prism 20 in the vertical direction (referred to as the direction x) in FIG. 1. Since the light beams on the area sensor 24 are relatively sheared or shifted, they interfere with each other to produce interference fringes.

The piezoelectric device 22 is now energized to move the prism 18 a slight distance in the vertical direction in FIG. 1 to change the length of the path traversed by the light reflected by the prism 18. The interference fringes are read highly accurately by the area sensor 24 in each step of changing the length of the path of the reflected light. This is so-called "fringe scanning".

The wavefront of the illuminating spherical wave and the aspheric surface to be measured can be best fitted or matched such as follows:

If the measured surface is a completely spherical surface, then it is possible to bring the wavefront of the illuminating spherical wave into full conformity with the measured surface. Since the light reflected from the spherical surface is of a complete spherical wave, the measuring light becomes parallel rays after having passed through the converter lens system. In reality, however, the measuring light that has passed through the converter lens system 14 is not of parallel rays, since the actual surface to be measured is aspheric. Nevertheless, when the measured surface best fits the illuminating spherical wave, the measuring light having passed through the converter lens system is most close to parallel rays.

Therefore, a third beam splitter may be disposed between the beam splitters 12, 16 to divide a portion of the measuring light, which may be converged by a condenser lens onto another area sensor. By positioning the light-detecting surface of such an area sensor in the focused position of the condensor lens, the intensity of light on the area sensor on the optical axis of the condenser lens can be maximized when the illuminating spherical wave best fits the measured surface. The the illuminating spherical wave can therefore be brought into a best-fitting relation to the measured surface based on the above principle.

Light rays of the measuring light from the aspheric surface being measured reach the light-detecting surface of the area sensor 24 without crossing each other. This fact can be confirmed in advance by light-ray tracking simulation.

Figure 3I:
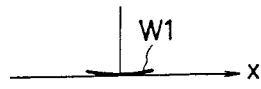
FIGS. 3(I) through 3(IV), 4 and 5 are diagrams illustrating a process of optically measuring an aspheric surface, using the device shown in FIG. 1.

Because the ring filter F1 is used at this time, the illuminating spherical wave illuminates only a portion of the aspheric surface including and near the optical axis. Assuming that the wavefront of the measuring light falling on the area sensor 24 at this time is indicated by W1 in FIG. 3(I), the wavefront W1 can be calculated according to interference fringe information read by the aforesaid fringe scanning process.

Actually, the shape of the wavefront W1 in the direction x is determined by a shear or shift in the direction x, and the shape of the wavefront W1 in the direction y (which is normal to the sheet of FIG. 1) is determined by a shear or shift in the direction y (which is caused to move the prism 20 in the direction y). The three-dimensional shape of the wavefront W1 can be determined by combining the shapes in the directions x, y. The radius of curvature of the spherical wavefront which best fits the measured aspheric surface at this time is referred to as R1 and is measured by the measuring means. By adding a spherical surface of the radius of curvature R1 to the wavefront shape W1 obtained in the manner described above, the shape S1 of the measured surface including and rear the optical axis can be known.

The above measuring cycle is repeated with the ring filter F1 replaced by the ring filter F2. The light applied to the measured surface at this time is indicated by shaded portions shown in FIG. 1, and illuminates the measured surface in a ring pattern. The radius of curvature of the spherical wavefront which best fits the illuminated portion of the measured aspheric surface at this time is referred to as R2.

Figure 3:
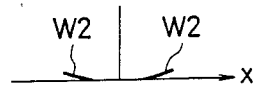
Figure 3:

Now, the wavefront of the measuring light falling on the area sensor 24 is a ring-shaped wavefront W2 as shown in FIG. 3(II). Therefore, the wavefront W2 is determined in the same manner as described above, and by adding a spherical surface of the radium of curvature R2 to the determined wavefront W2, the shape S2 of the illuminated portion of the measured surface can be known.

Then, the ring filter F2 is replaced by the ring filter F3, and the above measuring process is repeated. The radius of curvature of the spherical wavefront which best fits the illuminated portion of the measured aspheric surface at this time is referred to as R3. The wavefront of the measuring light falling on the area sensor 24, which is a ring-shaped wavefront W3 (FIG. 3(III)), is determined as described above, and a spherical surface of the radius of curvature R3 is added to the wavefront W3 to determine the shape S3 of the illuminated portion of the measured surface.

Finally, the shapes S1, S2, S3 are combined to determine the overall shape S (FIG. 3(IV)) of the measured surface of the object 30. The process of measuring the aspheric surface of the object 30 is now finished.

When interference fringe information is obtained from the fringe scanning process, calculations according to the Fourier transform are carried out to find the initial phase in each position. Inasmuch as $\tan^{-1}$ is calculated in order to find the phase, it is necessary to correct the phase by adding or subtracting $2\pi$ for a range exceeding a defined range of $-\pi \sim \pi$.

Figure 4:
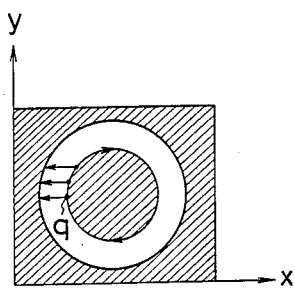

The above phase correction can be achieved as follows: When the ring filter F2 is used, the area in which interference fringes are produced on the light-detecting surface of the area sensor 24 is a doughnut-shaped area as shown in FIG. 4. With a position q on the inner circumference of the doughnut-shaped area being defined as a starting point, the phase on the inner circumference is followed along the arcuate arrows for phase correction to determine the initial phase on the inner circumference. Then, the respective points on the inner circumference are used as starting points, and correction is effected horizontally (vertically) to determine the initial phase in each of the points on the interference area. The above correction may be performed with reference to the outer circumference, rather than the inner circumference.

Figure 5:
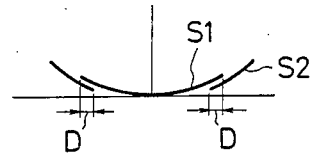

The phase correction required when the ring filter F1 is used may be carried out according to the above correcting process or a conventional process.

Where the measured portions S1 and S2 are joined to each other as shown in FIG. 5, there may be provided a common area D, and the portions S1, S2 may be brought into conformity with each other in the common area D upon calculations, so that the portions S1, S2 can be combined with high accuracy. To achieve this, common light-transmitting areas may be provided between successively used ring filters such as the ring filters F1, F2 and the ring filters F2, F3, for example.

With the arrangement of the present invention, as described above, two or more spherical wavefronts are involved in measuring an aspheric surface. More specifically, since a plurality of divided spherical wavefronts are involved with respect to respective portions of the aspheric surface to be measured, the range of measuring the aspheric degree of the measured surface is effectively increased. The divided wavefronts are produced by the ring filters, and only required wavefronts are applied to the surface to be measured, so that no extraneous light enters the measured area and hence any error which would be caused by such extraneous light is effectively removed. Interference fringes are read in detail by the fringe scanning process for highly accurate measurement.

While only three ring filters are illustrated, it is possible to use two ring filters or four or more ring filters. In general, the more the ring filters used, the greater the range of measuring the aspheric degree of a measured surface. The object to be measured may be fixed and the converter lens system may be moved in order to cause the wavefront of the illuminating spherical wave to fit the measured surface.

Although a certain preferred embodiment has been shown and described, it should be understood that many changes and modifications may be made therein without departing from the scope of the appended claims.

We claim:

1. A device for optically measuring an aspheric surface, comprising:

a fringe-scanning shearing interferometer for applying a wavefront of illuminating light to the aspheric surface and optically measuring the aspheric surface based on light reflected by the aspheric surface along a measurement optical path;

a plurality of ring filters having respective different light-transmitting areas and successively positionable, one at a time, in the illuminating light and outside of said mearsurement optical path for applying divided portions of said wavefront of illuminating light successively to the aspheric surface; and means for measuring the radius of curvature of the wavefront of illuminating light applied to the aspheric surface.

2. A device according to claim 1, wherein said ring filters. have substantially ring-shaped light-transmitting areas of different radii for dividing said wavefront into substantially ring-shaped portions.

3. A device according to claim 1, wherein said fringe-scanning interferometer has an illumination optical path for applying the wavefront of illuminating light to the aspheric surface, said ring filters being successively positionable in said illumination optical path.

* * * * *